United States Patent [19]
Saville et al.
[11] 3,872,247
[45] Mar. 18, 1975

[54] LOW COST OF HIGH FIDELITY HIGH POWER VARIABLE CLASS A AMPLIFIER-SPEAKER COMBINATION

[76] Inventors: Robert W. Saville, 108 Ahwahnee Rd., Lake Forest, 60045; John C. Sanderson, III, 1400 Londen Ln., Glenview, both of Ill. 60025

[22] Filed: Feb. 20, 1973

[21] Appl. No.: 333,478

Related U.S. Application Data

[63] Continuation-in-part of Ser. No. 145,257, May 20, 1971, abandoned.

[52] U.S. Cl. .......... 179/1 A, 330/138
[51] Int. Cl. .......... H03f 1/00
[58] Field of Search .......... 179/1 A, 1 F; 330/138, 330/140, 194, 198

[56] References Cited

UNITED STATES PATENTS

| | | | |
|---|---|---|---|
| 2,703,825 | 3/1955 | MacDonnald | 330/140 |
| 2,758,205 | 8/1956 | Lubkin | 330/138 |
| 2,922,846 | 1/1960 | Humphreys | 179/1 F |
| 3,014,995 | 12/1961 | Miller et al. | 179/1 A |
| 3,278,853 | 10/1966 | Hung Chang Lin | 330/140 |
| 3,320,365 | 5/1967 | Auernheimer | 179/1 A |
| 3,399,276 | 8/1968 | Wolff | 179/1 A |

*Primary Examiner*—William C. Cooper
*Assistant Examiner*—Douglas W. Olms
*Attorney, Agent, or Firm*—Hill, Gross, Simpson, Van Santen, Steadman, Chiara & Simpson

[57] ABSTRACT

A high fidelity power amplifier has a Darlington output stage directly connected to the coil of a speaker to provide current flow at all times which overrides the mechanical suspension system of the speaker so that cone vibration occurs only on one side of its mechanical rest position. A resistor is serially connected between the speaker coil and ground and serves to develop a current feedback signal to the input stage of the amplifier to linearize the impedance of the speaker. The input stage of the amplifier is capacitively coupled to the Darlington output stage and a bias restoring circuit is connected to the coupling capacitor improve fidelity by substantially eliminating signal peak flattening.

6 Claims, 4 Drawing Figures

LOW COST OF HIGH FIDELITY HIGH POWER VARIABLE CLASS A AMPLIFIER-SPEAKER COMBINATION

CROSS REFERENCE TO RELATED APPLICATION

This application is a continuation-in-part of our now abandoned earlier application, Ser. No. 145,257, filed May 20, 1971.

BACKGROUND OF THE INVENTION

1. Field of the Invention

This invention relates to power amplifiers and is primarily concerned with inexpensive high fidelity variable Class A power amplifiers having good transient response.

2. Description of the Prior Art

The prior art includes a multitude of power amplifiers covering a broad construction range from very simple to extremely complex structures. Generally, the amplifiers having simple structures suffer from the lack of certain qualities including a high power capability, low distortion, broad band pass, and good transient response. The more complicated structures usually fail to possess the qualities of low cost, compactness and power efficiency. If one considers the design requirements of (1) low cost, (2) compactness, (3) high power capability, (4) low distortion and broad band pass, and (5) good transient response, one or more of these requirements usually suffers in high fidelity power amplifier design in order that the amplifier may possess a higher degree of quality with respect to the other requirements. For example, the requirements of low cost and compactness may be subrogated with respect to the requirements for high power capability, low distortion and good transient response in the provision of an amplifier circuit which is generally simple in nature but which requires a rather elaborate, complex and expensive driving and bias circuitry.

It is therefore highly desirable and an object of the present invention to provide a power amplifier which possesses all of the above requirements. An attendant object of the present invention is to provide such a power amplifier in a very simple circuit configuration which does not require elaborate or complex driving and bias circuits.

In the electronics industry it is generally practiced that one company manufactures speakers and that another company manufactures amplifiers, without either company being aware of whose amplifier is to be coupled to whose speaker. The amplifier manufacturer, for example, designs for a nominal load and generally with only a linear portion of the working range of the load in mind, while a line of speakers will vary drastically with respect to impedance nonlinearity at the low end of its working range and even more drastically at the high end of such range. Only in an intermediate portion of the working range is the impedance substantially linear. In order to accommodate nonlinearity, it is a well accepted practice to feed back a voltage signal from the output of the power amplifier, which voltage signal represents the reflected electrical signal distortion. This technique, however, only approximates a system correction in that the acoustic performance of the speaker is a function of the ampere-turn product of the voice coil, and not the voltage applied to the voice coil. The advantageous relationship of acoustic performance with respect to voice coil current, and as opposed to applied voltage, resides in the sources of changes in speaker impedance which include the reactance of a voice coil, the nonlinear magnetic circuit, the nonlinear mechanical suspension of the speaker cone and the loading effects of the environment such as the mounting baffle, enclosure, etc. Therefore, the changes in speaker impedance involve such elements as may not be provided by the amplifier manufacturer or the speaker manufacturer, i.e., the loading effects of the environment.

The present invention has as one of its primary objects the provision of an amplifier-speaker combination which provides an acoustic performance which is not only linear in an intermediate portion of the working range of the speaker, but which is linearized at both the low and high ends of the working range.

SUMMARY OF THE INVENTION

An amplifier-speaker combination is provided to realize the foregoing objectives through the provision of an input stage, an output stage, a series direct current circuit including the output stage, the voice coil of a speaker and a resistor, a current feedback circuit connected between the junction of the resistor and voice coil and the input stage, a coupling capacitor connected between the input and output stages, and a bias restoring circuit connected to the coupling capacitor. The provision of current through the voice coil at all times improves fidelity by overriding the mechanical suspension system of the speaker. This in conjunction with the current feedback from the voice coil which in itself improves speaker distortion, most pronounced at higher frequencies, operates to linearize the reactance components existing in the voice coil. The provision of the bias restoring circuit causes the power amplifier stage to be continuously biased in the class A mode, allowing it to pass a waveform, of any amplitude up to design maximum, substantially without distortion. When no signal waveform is present, the bias current of the power amplifier stage is reduced to a low quiescent value, substantially reducing the heat generated by the circuit along with all its deleterious effects on the several circuit components. Further, a second advantage of reducing the bias current during quiescent periods is the substantial reduction in power supply load. This is of particular significance in battery-powered equipment.

In a preferred embodiment of the invention, the input stage includes two direct coupled transistors and the output stage is provided by a Darlington configuration having the output emitter directly connected to the voice coil of the speaker.

BRIEF DESCRIPTION OF THE DRAWING

Other objects, features and advantages of the invention, its organization, construction and operation will best be understood from the following detailed description of a preferred embodiment thereof taken in conjunction with the accompanying drawing, in which.

DESCRIPTION OF THE PREFERRED EMBODIMENT

General Description

Figure 1:
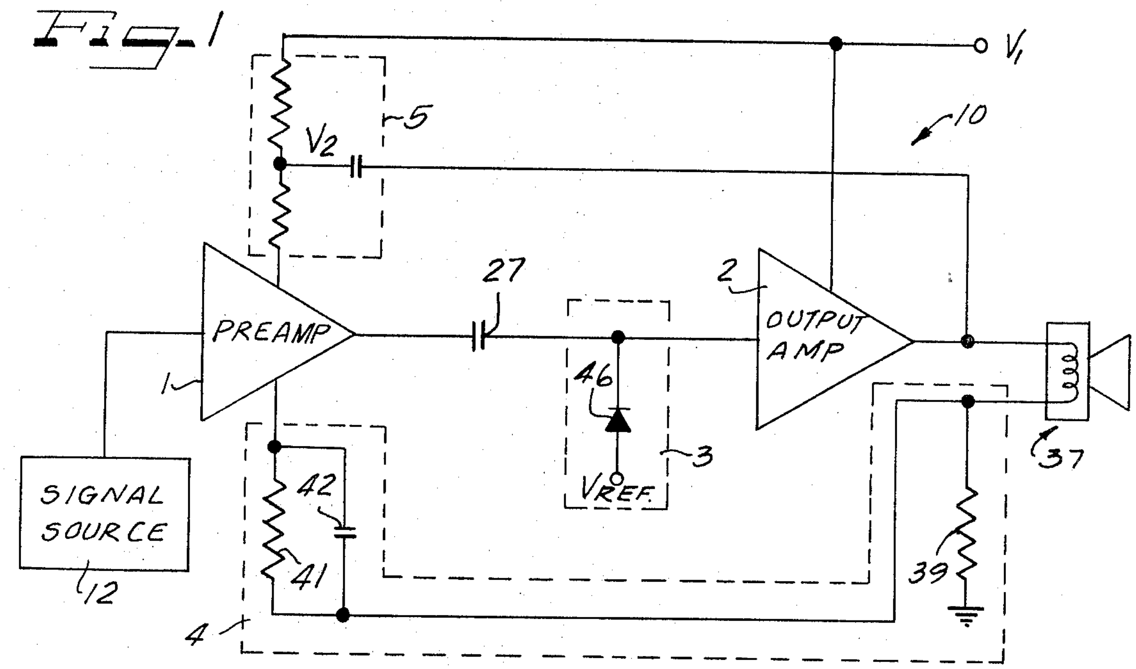
FIG. 1 is a block diagram of an amplifier-speaker combination constructed in accordance with the principles of the invention.

FIG. 1 illustrates an amplifier-speaker combination 10, 37 including a pre-amplifier 1, an output amplifier 2, a speaker 37, a DC restorer circuit 3, a current feedback circuit 4 and a bootstrap circuit 5.

The pre-amplifier 1 has a high input impedance and a low output impedance. The pre-amplifier 1 includes an input terminal 11 for receiving audio signals, here exemplified by an audio source 12. The output amplifier has a high input impedance and a low output impedance and drives the speaker 37, in a manner to be described in detail below, so as to provide a linear acoustic output in the nonlinear ranges of the speaker, e.g., below 100 Hz and above 2,500 Hz. These limits vary widely between speakers; the numbers shown are representative of a typical 8 ohm, 8 inch speaker.

The DC restorer circuit 3 responds to the peaks of the audio waveform to shift the bias at the input of the output amplifiers so that the voltage peaks can be passed with minimum distortion and can be almost equal to the potential of the power supply, e.g., a 20 volt supply will permit a signal peak of nearly 20 volts.

Attention is invited to the current feedback feature which, contrary to voltage based distortion control techniques wherein a portion of the output voltage signal to a nonlinear speaker is fed back to cause the output voltage waveform to have minimum distortion, feeds back a sample of the dynamically distorted current waveform to correct system operation in accordance with actual acoustic distortion.

Figure 2:
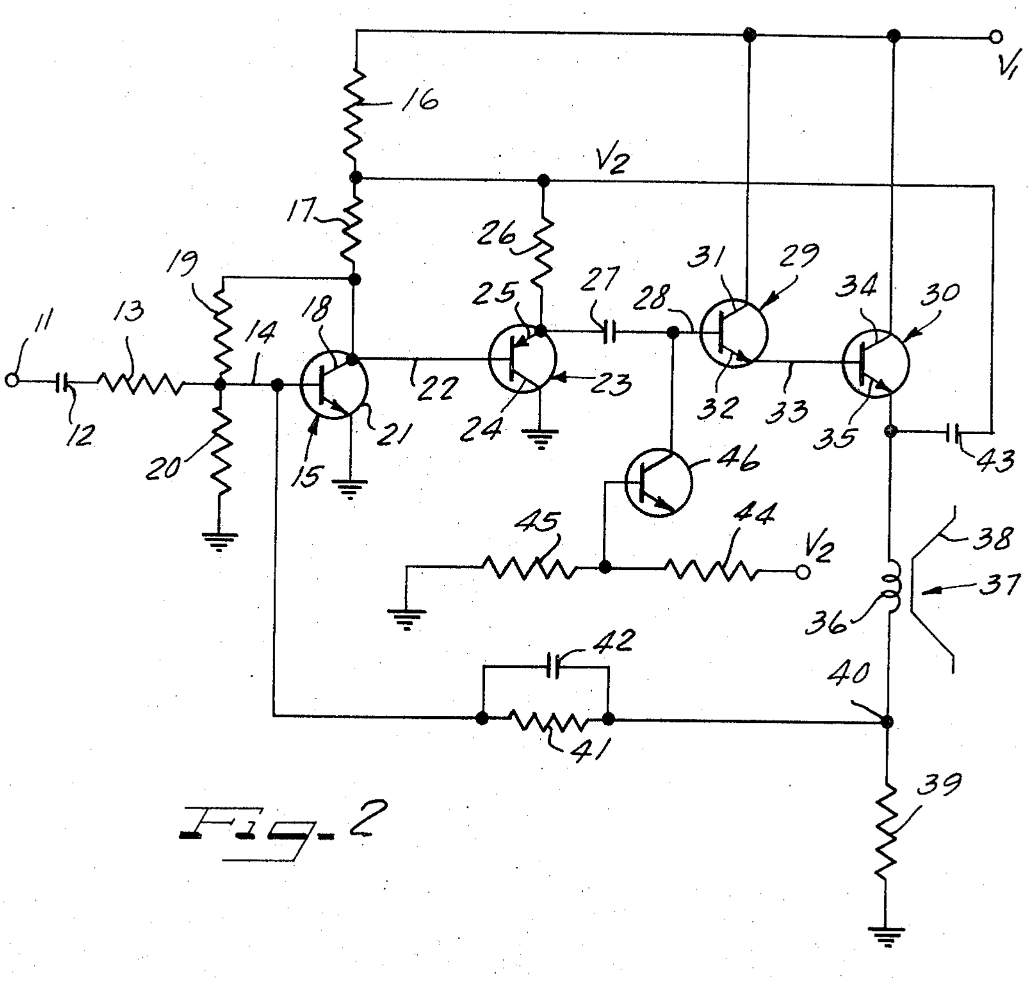
FIG. 2 is a schematic circuit diagram of a preferred embodiment of the power amplifier-speaker combination illustrated in block form in FIG. 1.

In FIG. 2, a power amplifier 10 is illustrated as including an input stage comprising an input terminal 11, a coupling capacitor 12 and a resistor 13 connected between the input terminal 11 and a base 14 of a transistor 15. The transistor 15 has bias potentials supplied thereto from its collector 18 by way of a plurality of resistors 19 and 20. The transistor 15 includes a collector 18 which is connected to a supply potential V2 by way of the resistor 17, which is in turn connected to a supply potential V1 by way of a resistor 16. The transistor 15 also includes an emitter 21 which is connected to ground.

The collector 18 of the transistor 15 is connected to a base 22 of a transistor 23 which is provided in an emitter follower configuration and which includes a collector 24 connected to ground and an emitter which is connected to the supply potential V2 by way of a resistor 26. The resistor 16 and a capacitor 43 provide, in a manner well known to those versed in the art, bootstrap voltage V2. The components 11–26 and 43 therefore constitute the input stage (pre-amplifier 1) of the power amplifier 10.

A coupling capacitor 27 is connected between the emitter 25 of the transistor 23 and a base 28 of a transistor 29 which is connected in a Darlington configuration with a transistor 30. The transistor 29 includes a collector 31 which is connected to the supply potential V1 and an emitter 32 which is connected to a base 33 of the transistor 30. The transistor 30 includes a collector 34 which is connected to the supply potential V1 and an emitter 35 which is connected in a series circuit between the supply potential V1 and ground including a voice coil 36 of a speaker 37 and a small value resistor 39. The elements 28–35 therefore constitute the output stage (output amplifier 2) of the power amplifier 10 for driving the voice coil 36 to vibrate a cone 38 of the speaker 37.

At a junction 40 between the voice coil 36 and the resistor 39, a feedback circuit comprising a resistor 41 and a parallel capacitor 42 is extended back to the transistor 15 of the input stage. The resistor 39, the resistor 41 and the capacitor 42 therefore constitute the current feedback circuit 4 as the means for deriving and delivering a current feedback signal to the input stage.

A resistor 44 and a resistor 45 are connected between a supply potential V1 and ground and provide a junction point for the connection of a rectifier to the junction between the coupling capacitor 27 and the base 28 of the transistor 29. The rectifier may be provided by a diode having its cathode connected to the base 28 and its anode connected to the resistors 44 and 45; however, the preferred embodiment utilizes the base-collector of a transistor 46. The components 44–46 constitute the DC restorer circuit 3 as a bias restoring circuit as will be evident from the detailed description below.

Figure 4:
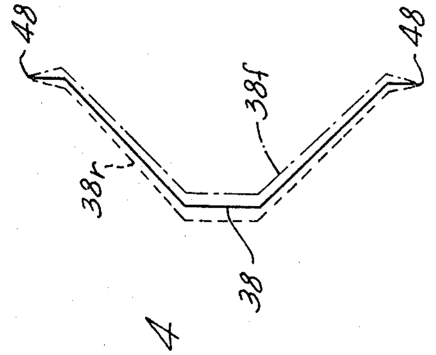
FIG. 4 is a diagrammatic representation of a speaker cone illustrating positions of rest and cone vibration.

FIG. 4 is a diagrammatic illustration of the speaker cone 38 having a fixed mechanical suspension, here referenced 48, as generally provided in speaker construction. The reference 38 in FIG. 2 to a solid line construction denotes the mechanical rest position of the speaker, the broken line position indicated by the reference 38*r* indicates the positions in which a speaker may vibrate in response to one direction of current flow through its voice coil, and the broken line referenced 38*f* indicates position of speaker cone vibration in response to the opposite direction of current through the voice coil of the speaker. As will be understood from the circuit of FIG. 1 and the description below, a speaker driven by a circuit constructed in accordance with the principles of the present invention will vibrate on only one side of the rest position.

Detailed Description

If one were to provide an amplifier load curve of current in the voice coil of a typical AC coupled speaker where there is no continuous current in the voice coil, it would be shown that for the durations of signal swing around zero, the behavior of the speaker cone is at the mercy of the mass and mechanical suspension of the cone; therefore, during such periods and during such times as quick release of percussive signals, for example, the mass and suspension of the speaker cone tends to mechanically drive the cone beyond its mechanical rest position and toward, and perhaps even beyond, the mechanical rest position in an unpredictable and random manner. Upon a subsequent attack, particularly an attack having a short rise time, the ability to overcome the inertia of the cone is random and unpredictable and accordingly causes distortion.

Figure 3:
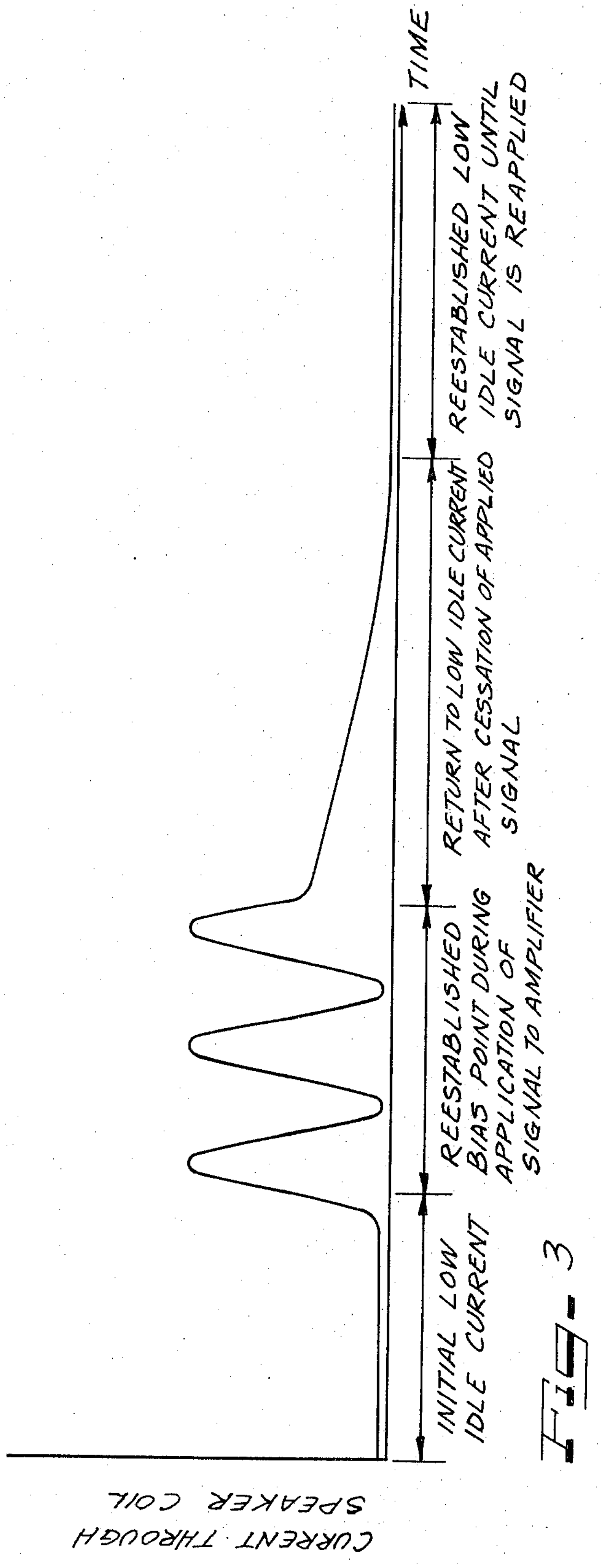
FIG. 3 is a graphic illustration of current through the speaker of FIGS. 1 and 2.

Referring to the output stage of FIGS. 1 and 2, it is clearly evident that with the Darlington configuration transistors 29 and 30 providing a constant flow of current to the voice coil 36 (idle current in FIG. 3), the speaker cone 38 is influenced to move only in an area on one side of its mechanical rest position (FIG. 4). If one were to construct an amplifier load curve for the circuit illustrated in FIGS. 1 and 2 of current in the voice coil 36 with respect to current, there would be a constant direct current value horizontal to the current axis above which the amplified signal varies (signal portion of FIG. 3). When the cone 38 upon energization passes through the zero axis of the impressed signal, there is substantial current in the voice coil 36 to maintain control over the mechanical suspension and mass of the cone so that upon the termination of the amplified signal, the cone slowly moves toward its mechanical rest position whereby subsequent re-energization of the voice coil 36 by an amplified signal does not experience a wide variety of positions of the cone 38 and unpredictable conditions of inertia to be overcome.

The circuit of FIGS. 1 and 2 is provided with means 4 for developing and providing a current feedback signal to the input stage of the amplifier including a very low value resistor 39 connected between the voice coil 36 and ground. A resistor 41 and a capacitor 42 are connected to the junction point 40 to provide the feedback signal to the transistor 15. The utilization of current feedback from the voice coil improves speaker distortion in the nonlinear ranges, particularly at the lower and at the higher frequencies, and this technique, plus the dc component in the voice coil 36, tends to linearize the reactance components existing in the coil in response to actual distortion to provide a linear audio output from the speaker.

A capacitor 43 connected between the emitter 35 of the transistor 30 and the junction between the resistors 16 and 17 provides a well known bootstrap arrangement for the amplifier, allowing output voltages whose peak-to-peak value closely approach that of the supply potential V1.

The application of a tone or audio signal at the input terminal 11 causes the signal to be amplified and coupled by the input stage and the coupling capacitor 27 to the base 28 of the transistor 29 of the output stage. Negative going portions of, for example, a high level sine wave would ordinarily be clipped or flattened at the base 28 of the transistor 29 due to improper bias of the output amplifier stage. The present invention includes means for substantially eliminating the flattening of the input signal, at least to the extent that such is not audibly noticeable. This means is a bias restoring circuit here illustrated in the form of the resistors 44 and 45 and the base-collector junction of the transistor 46. The just mentioned junction of the transistor 46 can be provided by, and visualized as, a rectifier having its cathode connected to the base 28 and its anode connected to the junction between the resistors 44 and 45. As the signal is going negative and tending to flatten, at levels near the power supply potentials, the transistor 46 becomes conductive under the control of the potential established at the junction between the resistors 44 and 45. As the signal is going negative and tending to flatten, at levels near the power supply potentials, the transistor 46 becomes conductive under the control of the potential established at the junction between the resistors 44 and 45. This action clamps the base 28 and prevents this node from any further negative excursion. The emitter 25 of the transistor 23 continues negative to the negative peak of the signal waveform. During this period, an amount of charge equal to the negative peak amplitude of the signal waveform is discharged from the capacitor 27 through the circuit composed of components 25, 45 and 46. As the signal waveform starts positive from its negative peak, the base 28 of the transistor 29 is drawn positive, the transistor 46 junction goes out of conduction, and the output of the amplifier goes positive. It may now be seen that the output of the amplifier goes only positive from its rest position. Through the use of the Darlington connection of the transistors 29 and 30, the input impedance of the output stage as measured at the base 28 is very high (in excess of 1 megohm). Because of this high impedance, very little charging current is drawn through the capacitor 27. Such small amounts of charge that are accumulated during each cycle are removed at the negative peak of the signal waveform as detailed above. Upon removal of the signal waveform, the capacitor 27 is slowly recharged, lowering the current in the output stage to its normally low idle value.

As an example of a circuit constructed in accordance with the present invention, the following values were utilized for the components of the circuit disclosed in FIG. 1:

| | |
|---|---|
| 13, 26 | 10K |
| 16 | 1K |
| 17 | 100K |
| 19 | 560K |
| 20 | 27K |
| 36 | 8 ohm |
| 39 | .39 ohm |
| 41 | 24K |
| 44 | 1.5K |
| 45 | 360 ohm |
| 12, 43 | 10 μf |
| 27 | .01 μf |
| 42 | 470 μf |
| 15, 46 | 2N 3860 |
| 23 | G.E. D29E1 |
| 29 | Motorola MPS-A14 |
| 30 | Motorola MJE 3055 |

The performance of a circuit constructed in accordance with FIGS. 1 and 2 and the above values provided an output distortion of only approximately 0.08 percent at 20 volts P/P, a rise time of bias which was extremely fast, in the order of 100 μs with an audible flattening that was non-existent, and the accoustical sound properties appeared to be superior to any other known amplifier-speaker combination, which superiority is believed to be due to the direct current in the voice coil and the excellent signal control due to current feedback from the resistor 39 by way of the resistor 41 and the capacitor 42.

The fact that current flows through the voice coil at all times in the same direction appears to provide better fidelity, which is considered to be due to the override of the speaker mechanical suspension system. In addition, the use of current feedback from the voice coil improves speaker distortion, particularly at higher frequencies, and this technique in addition to the steady dc component in the voice coil tends to linearize the nonlinear reactance component existing in the coil.

The only disadvantage of the foregoing circuit worth mentioning is the increase in heat in the voice coil due to the direct current component; however, this is offset by the extremely low idle or no-signal current (30–50 ma).

The economy of the components, excellent fidelity, compactness of the circuit, light weight and low idle current appear to more than offset the slightly lower overall efficiency and the increased heating of the voice coil for a given power output. The overall efficiency as measured with a sine wave for the particular circuit above was found to be 25–28 percent as compared to approximately 30–32 percent for a given power output for a comparable ac coupled circuit.

These losses are divided approximately equally between the voice coil and the output transistor circuitry. It is also readily apparent that the amplifier circuit advantageously lends itself to construction by utilization of integrated circuit techniques.

Although the present invention has been described by reference to a specific illustrative embodiment, many changes and modifications thereof may become apparent to those skilled in the art without departing from the spirit and scope of the invention, and it is to be understood that it is intended that the patent warranted hereon shall include all such changes and modifications as may reasonably and properly be included within the scope of this contribution to the art.

What is claimed is:

1. An amplifier circuit in combination with and connected to a speaker having a voice coil and a speaker cone, comprising:

an input amplifier stage for receiving input audio signals;

an output amplifier stage having an output terminal directly connected to said voice coil of said speaker and constantly providing a current through said voice coil;

capacitive coupling means connected between said input and output stages;

current feedback means for direct connection to said voice coil of said speaker and connected to said input stage, said feedback means including a low ohmic resistor connected in series with said voice coil; and bias means connected to said capacitive coupling means and to said output stage for varying the bias on said output stage to allow a very low standby idle current while providing for the transmission of any applied signal whose peak-to-peak value is less than the supply potential, the current constantly provided through said speaker coil and the varying bias and the feedback current providing a linear acoustic response over the working range of said speaker.

2. The combination according to claim 1, wherein said output stage includes a transistor having a base connected to said capacitive coupling means and said bias means includes a rectifier connected between said base and an electrical supply and operable in response to peaks of the amplified signal to vary the bias and substantially eliminate the distortion ordinarily associated with amplifiers biased nearly to cutoff.

3. The combination set forth in claim 2, wherein said rectifier includes a diode, and comprising a voltage divider circuit connected to said diode.

4. The combination set forth in claim 2, comprising a voltage divider circuit, and wherein said bias means comprises a transistor having a base-collector junction connected between said voltage divider and said base of said output stage transistor.

5. The combination set forth in claim 1, wherein:

said input stage comprises a common emitter amplifier section having an input for receiving audio input signals and for receiving feedback signals and an output connected to said capacitive coupling means;

said output stage comprises a Darlington type amplifier section having an input connected to said capacitive coupling means and means including said output terminal and said resistor for establishing a bias current series circuit for said voice coil; and said current feedback means comprises a connection between the junction of said voice coil and said resistor and an impedance connected between said junction and said input of said common emitter amplifier section.

6. A variable bias class A circuit for reproducing audio signals, in combination comprising:

a speaker including a coil and a mechanically suspended speaker cone which is influenced in accordance with the energization of said coil and which has a mechanical rest position when said coil is not energized;

a first amplifier stage including an input for receiving the audio input signals and an output for providing amplified audio signals;

capacitive coupling means connected to said output of said first amplifier stage; and a second amplifier stage including an input connected to said capacitive coupling means for receiving the amplified audio signals, a variable bias control circuit, and output means for impressing the further amplified audio signals on said speaker coil to cause said speaker cone to vibrate, said output means comprising a direct current series circuit connected between electrical supply potentials and including an output transistor having a collector and an emitter connected in series with said speaker coil and bias means to constantly provide a direct current coil bias which is effective to influence said speaker cone to vibrate about a bias position on one side of its mechanical rest position, said second amplifier stage connected to an electrical supply potential and including means biasing said stage to near cut off, said bias means including a bias varying circuit connected to said capacitive coupling means and to said input of said second amplifier stage and operable to shift the bias on said second amplifier stage for maintaining class A operation in response to signal peaks which approach a level equal to the potential of the electrical supply.

* * * * *